March 11, 1969  H. L. CROSWHITE  3,431,929
SNAP-ACTION FLYWEIGHT GOVERNOR FOR DEVELOPING
A SPEED SENSITIVE PRESSURE SIGNAL
Filed Jan. 5, 1966  Sheet 1 of 2

INVENTOR:
HOWARD L. CROSWHITE
BY
ATTORNEYS.

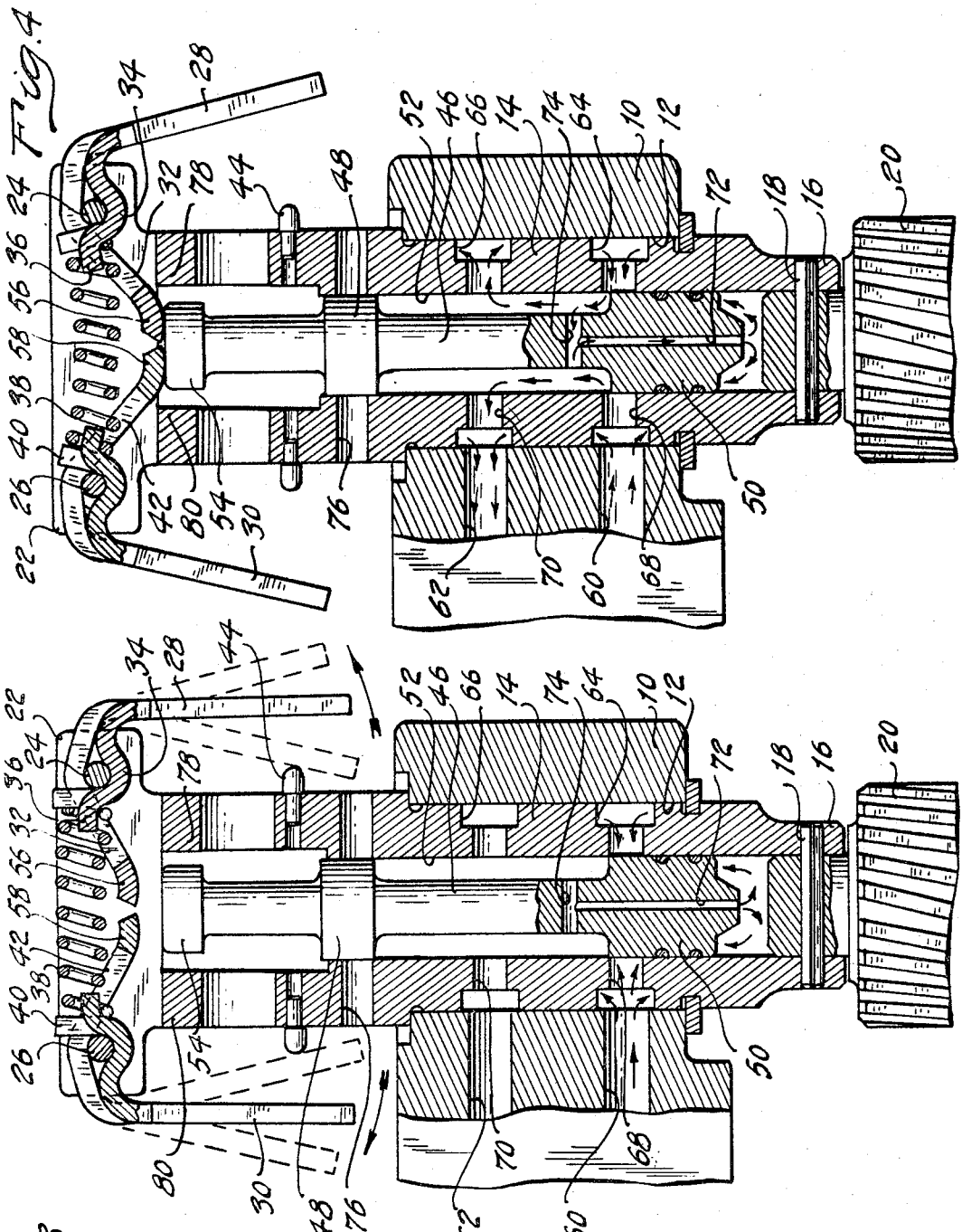

3,431,929
SNAP-ACTION FLYWEIGHT GOVERNOR FOR DEVELOPING A SPEED SENSITIVE PRESSURE SIGNAL
Howard Linn Croswhite, Livonia, Mich., assignor to Ford Motor Company, Dearborn, Mich., a corporation of Delaware
Filed Jan. 5, 1966, Ser. No. 518,818
U.S. Cl. 137—56  4 Claims
Int. Cl. G05d 13/26, 13/18

ABSTRACT OF THE DISCLOSURE

A rotating speed governor valve assembly having flyweights engaged by a yieldable element that changes its line of action against the flyweights from one position to the other with a snap-action.

---

My invention relates generally to a governor valve mechanism for developing a pressure signal that is proportional in magnitude to the speed of rotation of a driven member. More particularly it relates to improvements in a centrifugally responsive, flyweight governor valve assembly which is characterized by a delayed response to changes in speed.

I contemplate that my improved governor valve assembly can be used in an automatic control valve system for an automatic, multiple speed ratio, power transmission mechanism for use in the driveline of a wheeled vehicle. Such control systems comprise fluid pressure operated clutch and brake servos and multiple shift valves that control distribution of pressure from a pressure source to each of the servos. As speed ratio changes are initiated, the shift valves respond to operating variables, such as the driven speed and the torque demand of the vehicle operator. The governor of my invention is capable of supplying a suitable speed signal for use in a system of this type.

My governor includes a modulator valve element that modulates the pressure supplied by the pressure source to produce an output signal that is proportional to the driven speed. In order that a signal of a useful magnitude can be obtained at low speeds and in order to produce sufficient variation in the magnitude of the signal with changes in speed at high operating speeds, it is desirable to inhibit the modulating action of the valve at low speeds and to calibrate the valve appropriately to satisfy the design conditions for high speed operation. A first speed ratio shift is accomplished as the inhibiting influence on the governor is overcome and a second speed ratio shift is obtained as the output signal developed by the governor at high speeds reaches a predetermined value for any given delivered torque or driver torque demand. Thus, the modulating characteristics of the governor can be calibrated to satisfy the design requirements of high speed operation of the transmission mechanism without adversely influencing the signal made available to the shift valve that controls the shift from lowest speed ratio to the intermediate speed ratio.

One example of a governor valve assembly that will produce a characteristic of this type is disclosed in Duffy's U.S. Patent No. 3,048,184, which is assigned to the assignee of my instant invention. Reference may be had to that patent disclosure for the purpose of supplementing this disclosure.

It is an object of my invention to provide a governor valve assembly that will establish a pressure speed characteristic that is similar in form to the characteristic disclosed in Duffy Patent No. 3,048,184, but which includes flyweight valve actuators rather than centrifugally responsive primary and secondary valve elements in the compound valve arrangement disclosed by Duffy.

It is a further object of my invention to provide a flyweight governor valve mechanism capable of producing a speed sensitive pressure signal throughout a speed range that will result in development of a pressure signal variation with changing speeds of significant magnitude, but which is rendered ineffective at speeds less than the calibrated speed range.

It is a further object of my invention to provide a governor valve mechanism of the type above set forth wherein modulating forces are applied to a modulator valve element of the system by means of centrifugally operated flyweights, and wherein means are included for opposing the influence of centrifugal force on the flyweights at speeds less than a predetermined value.

Further objects and features of my invention will become apparent from the following description and the accompanying drawings, wherein.

Figure 1:
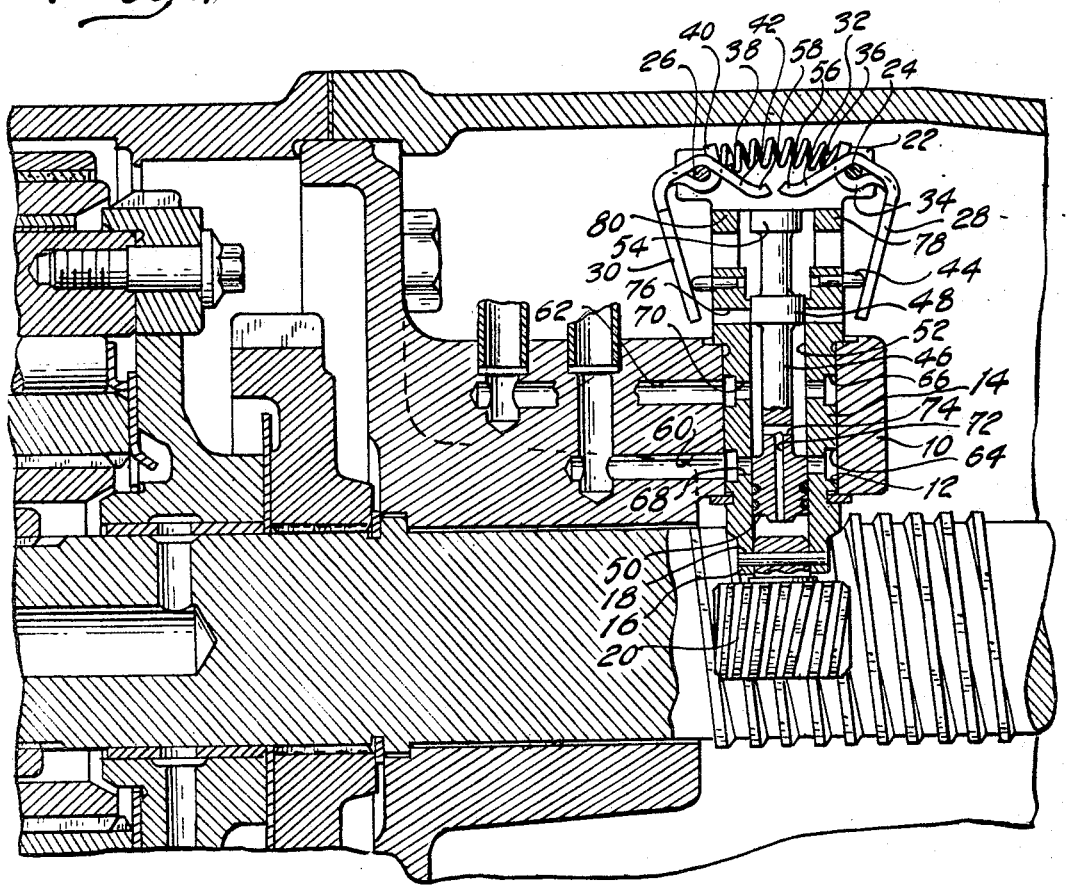
FIGURE 1 shows in schematic cross sectional form my improved governor valve assembly.

In FIGURE 1 a governor body is identified by reference character 10. It may be made of cast aluminum or some other suitable material such as iron. It is formed with a valve opening 12 through which is received a cylindrical valve sleeve 14. The sleeve 14 is journaled rotatably within the opening 12 and it extends outwardly from either side thereof. One end 16 of the sleeve 14 is pinned by means of a pin 18 to a drive gear 20 having helical teeth which mesh with helical teeth formed on a gear carried by the driven shaft. The axis of the driven shaft may be situated transversely with respect to the axis of the sleeve 14. Thus the sleeve 14 is driven at a speed that is proportional to the speed of the shaft.

Connected to or formed integrally with the opposite end of the sleeve 14 is a bifurcated portion having a first arm 22. Two flyweight pins 24 and 26 extend from one side of the bifurcated portion to the other. A pair of flyweights 28 and 30 are pivoted, respectively, on the pins 24 and 26. Flyweight 28 includes a transversely extending arm 32 which circles around pin 24. A mid portion of the arm 32 defines a tab 34 which is integral with the flyweight 28. The tab 34 encircles the underside of the pin 24 as the arm 32 encircles its opposite side. Thus a pivotal connection is established between the flyweight 28 and the pin 24. The other flyweight 30 is identical to flyweight 28.

Tab 24 defines also a spring seat 36 for a snap action spring 38. This spring is situated between seat 36 and a corresponding seat 40 carried by flyweight 30. Flyweight 30 also is formed with a transversely extending arm 42 which corresponds to the arm 32 for flyweight 28.

The movable end of flyweight 28 and the corresponding end of flyweight 30 engage a snap ring 44 which forms a flyweight stop. This limits the clockwise pivotal motion of the flyweight 28 and the counterclockwise pivotal motion of the flyweight 30, as viewed in FIGURE 1. The spring 38 creates a moment on each of the flyweights which tends to urge them to the position shown in FIGURE 1.

Located within sleeve 40 is a valve spool 46. It is formed with spaced valve lands 48 and 50. The spool extends outwardly in an upward direction from the chamber 52 formed in the sleeve 14. Its outermost end 54 is adapted to be engaged by the radially inward ends 56 and 58, respectively, of the arms 32 and 42. When the flyweights 28 and 30, respectively, rotate about their pivot pins.

Valve body 10 is formed with a control pressure feed passage 60 which may be in communication with a positive displacement pump. A governor pressure signal delivery passage 62 also is formed in body 10.

An annular groove 64 communicates with passage 60 and a corresponding annular groove 66 communicates with passage 62. Each groove 64 and 66 communicates with the interior of chamber 52 through one or more ports as shown at 68 and 70, respectively.

Valve spool 46 may be formed with pressure delivery passages 72 and 74 which establish communication between the lower end of the chamber 52 and the annular space between lands 48 and 50. The lower end of chamber 52 is closed by the cooperating end of gear 20.

An exhaust port 76 also is formed in the sleeve 14. It intersects the chamber 52 at a location adjacent land 48. Ports 64 and 68 intersect the chamber 52 at a location adjacent land 50.

Counterclockwise movement of weight 28 and clockwise movement of weight 30, as viewed in FIGURE 1, is limited by stops 78 and 80 carried by wall 22 of the upper bifurcated portion of the sleeve 14.

During operation of the flyweight governor described in FIGURE 1, the gear that engages gear 20 causes sleeve 14 to rotate within valve body 10 at a speed that is proportional to the speed of the shaft upon which the gear is carried. Instantly, delivery of control pressure from passage 60 is blocked by land 50. Thus the pressure made available to governor pressure signal passage 62 is substantially zero. Any pressure buildup that may occur in the annular space between lands 48 and 50 causes a corresponding pressure buildup to occur on the lower side of land 50, which tends to urge the spool 46 to a flow blocking position.

As the speed of sleeve 14 increases from a value of zero to a speed that is less than a predetermined value, such as 400 r.p.m., the weights 28 and 30 are held in the position shown by springs 38. The tendency for the weights 28 and 30 to move radially outwardly at speeds less than a predetermined value is overcome by the countermoment produced by the spring 38. Thus no pressure signal is developed in passage 62 at speeds between zero and the predetermined speed of the shaft that drives sleeve 14.

At a predetermined speed for example, a speed corresponding to 400 r.p.m. of the driving shaft the countermoment produced by spring 32 is overcome and the flyweights 28 and 30 move radially outwardly with a snap-action until the ends 56 and 58 engage the end 54 of the spool 46. This produces a downwardly directed force on the spool 46, the magnitude of which is a function of the speed of sleeve 14. This force causes the spool 46 to become displaced thereby allowing the pressure from passage 60 to develop in the annular space in chamber 52 between lands 48 and 50. This same pressure acts upon the lower end of land 50 thereby producing a pressure force that opposes the mechanical force of the flyweights.

FIGURE 3 shows the portion of the spring 38 before a snap action occurs, and FIGURE 4 shows the spring portion when the valve is modulating the line pressure.

As the speed of rotation of the sleeve 14 increases, the force of the flyweights increases thereby causing the degree of communication between exhaust port 76 and passage 62 to decrease while simultaneously increasing the degree of communication between passage 60 and the exhaust passage 62. This results in the development of a pressure in passage 62 that is related functionally in magnitude to the driven speed of the shaft. The valve and the flyweights can be calibrated to provide a pressure speed characteristic that can be used by any particular control circuit requiring the use of a speed sensitive valve arrangement.

Figure 2:
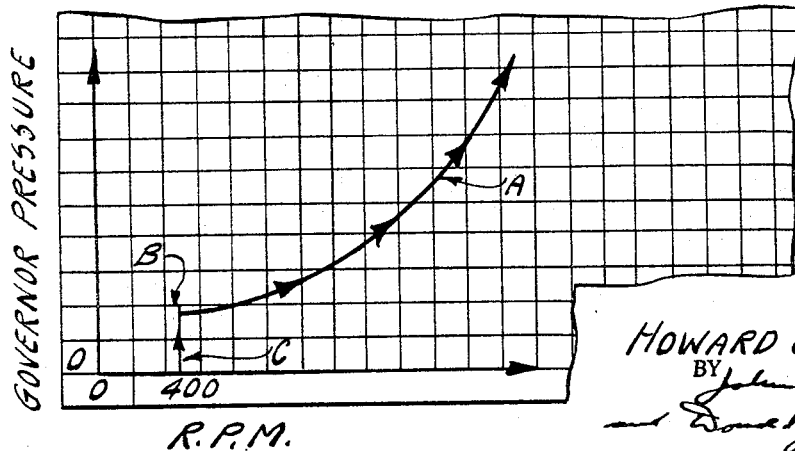
FIGURE 2 shows a pressure speed characteristic for the speed signal produced by the mechanism of FIGURE 1, and FIGURES 3 and 4 show two operating positions for the valve of FIGURE 1.

In FIGURE 2 I have illustrated in general the shape of the curve that is produced when the pressure signal is plotted against speed. At a speed in excess of 400 r.p.m. a second order curve is developed as indicated by reference letter A. At speeds less than 400 r.p.m. the output pressure signal is zero. At the transition point the pressure increases from zero to a value corresponding to point B. The characteristic curve at the critical speed is represented by a vertical line C.

In order to permit the radially outward movement of the flyweights when the governor pressure approaches the magnitude of the pressure in passage 60, I have provided stops 78 and 80 which are engaged by the ends 56 and 58 of the flyweight levers. Excessive movement of the flyweights in a radially outward direction thus is prevented.

When the flyweights 28 and 30 move radially outwardly upon acceleration of a driving shaft, the line of action of the force of spring 38 shifts from the FIGURE 3 position to the FIGURE 4 position. This produces a snap-action that precisely defines the transition point during acceleration. As the speed of the driving shaft decelerates and approaches a zero value, the inhibiting action of spring 38 will occur at a speed less than the speed at which the inhibiting action ceased during acceleration of the shaft. This introduces a hysteresis feature that prevents hunting of the valve spool 46 between a modulating position and a nonmodulating position.

Having thus described a preferred form of my invention, what I claim and desire to secure by U.S. Letters Patent is:

1. In a governor valve assembly for producing a pressure signal that is proportional in magnitude to the driven speed of a driven member, a cylindrical valve body adapted to rotate about its geometric axis, a control pressure passage adapted to communicate with the interior of said body, a governor pressure passage adapted to communicate with the interior of said body and to conduct a pressure signal therefrom, an exhaust port in said body, modulator valve means including a valve element movably disposed in said body for modulating the control pressure supplied to said body thereby establishing a pressure signal in said governor pressure passage, a flyweight pivotally mounted on said body including a portion engageable with said valve element whereby centrifugal forces acting on said flyweight upon rotation of said body establish a mechanical force on said valve element that actuates said valve means, means for overruling the influence of said flyweight at speeds less than a predetermined value, said flyweight being adapted for rotation about a pivot point carried by said body, spring means acting on said flyweight and adapted to produce a force thereon along a line of action that is displaced on one side of said pivot, said force opposing a centrifugally induced moment acting on said flyweight, the force of said spring means being overcome at speeds greater than a predetermined value, the line of action of the force of said spring means being shifted when said governor is operating at speeds greater than said predetermined value.

2. In a governor valve assembly for producing a pressure signal that is proportional in magnitude to the driven speed of a driven member, a cylindrical valve sleeve adapted to rotate about its geometric axis, a control pressure passage adapted to communicate with the interior of said sleeve, a governor pressure passage adapted to communicate with the interior of said sleeve and to conduct a pressure signal therefrom, an exhaust port in said sleeve, modulator valve means including a valve element movably disposed in said sleeve for modulating the control pressure supplied to said sleeve thereby establishing a pressure signal in said governor pressure passage, flyweights pivotally mounted on said sleeve including a portion engageable with said valve element whereby centrifugal forces acting on said flyweights upon rotation of said sleeve establish a mechanical force on said valve element that actuates said valve means, and means for overruling the influence of said flyweights at speeds less than a predetermined value, said overruling means comprising a yieldable element that engages portions of said flyweights thereby establishing a force thereon that produces a moment to oppose the moment established by centrifugal action due to rotation of said sleeve, the line of action of said force passing on one side of the pivot axis of each flyweight when the speed is less than a predetermined value and passing on the other side of the pivot axis of each flyweight when said predetermined speed is exceeded, the transition of said line of action from one position to the other occurring upon a change of position of said yieldable element with a snap-action.

3. A governor valve assembly for producing a pressure signal that is proportional in magnitude to the speed of rotation of a driven member, a rotary valve body drivably connected to said driven member for rotation about its principal axis, a control pressure passage, a governor pressure passage and an exhaust port communicating with the interior of said body, valve means including a valve element in said body for modulating the pressure in said control pressure passage to produce a resultant signal in said governor pressure passage, centrifugally operated flyweights carried by said body for producing a valve actuating force on said valve element, and yieldable means for inhibiting the contrifugal influence of said flyweights on said valve element at speeds less than a predetermined value, said yieldable means being shifted upon movement of said flyweights radially outwardly with respect to the axis of rotation of said body whereby its inhibiting action occurs at a speed less than said predetermined value as said body decelerates from a high speed to a low speed.

4. A governor valve assembly for producing a pressure signal that is proportional in magnitude to the speed of rotation of a driven member, a rotary valve body drivably connected to said driven member for rotation about its principal axis, a control pressure passage, a governor pressure passage and an exhaust port communicating with the interior of said body, valve means including a valve element in said body for modulating the pressure in said control pressure passage to produce a resultant signal in said governor pressure passage, centrifugally operated flyweights carried by said body for producing a valve actuating force on said valve element, and yieldable means for inhibiting the centrifugal influence of said flyweights on said valve element at speeds less than a predetermined value, said yieldable means comprising a compression spring engageable with said flyweights and adapted to establish a force thereon that produces a moment to oppose the moment established by centrifugal action due to rotation of said body, the line of action of said force passing on one side of the pivot axis of each flyweight when the speed is less than a predetermined value and passing on the other side of the pivot axis of each flyweight when said predetermined speed is exceeded, the transition of said line of action from one position to the other occurring upon a change of position of said spring with a snap-action.

References Cited

UNITED STATES PATENTS

| | | | |
|---|---|---|---|
| 2,588,140 | 3/1952 | McFarland | 137—56 X |
| 2,653,020 | 9/1953 | Stinson | 137—53 X |
| 2,762,384 | 9/1956 | Rosenberger | 137—56 X |

CLARENCE R. GORDON, *Primary Examiner.*

U.S. Cl. X.R.

73—538